April 7, 1970 C. G. CLARK 3,504,812
CONVEYING MACHINE
Filed April 1, 1968 6 Sheets-Sheet 1
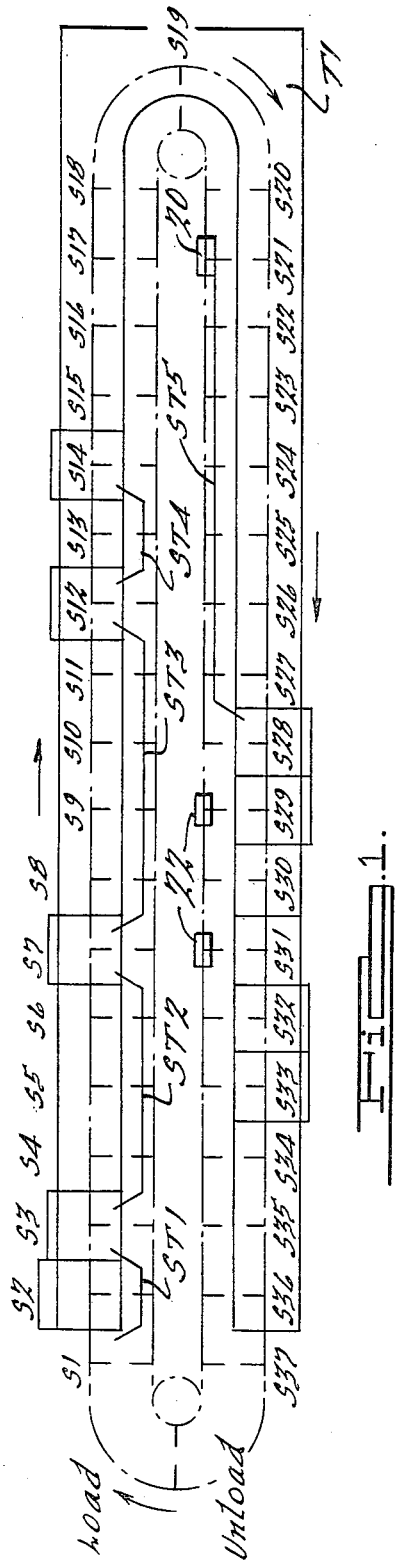
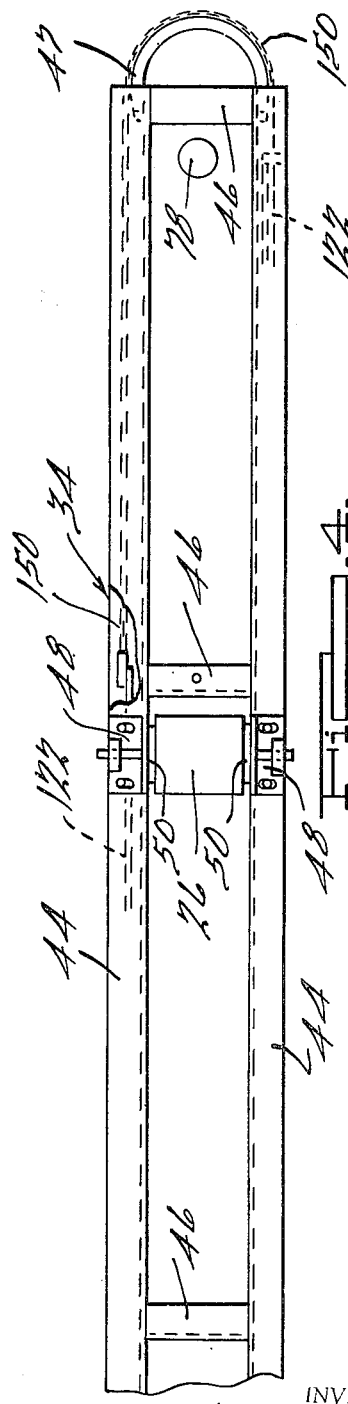
INVENTOR.
Chester G. Clark.
BY
Harness, Dickey & Pierce
ATTORNEYS.

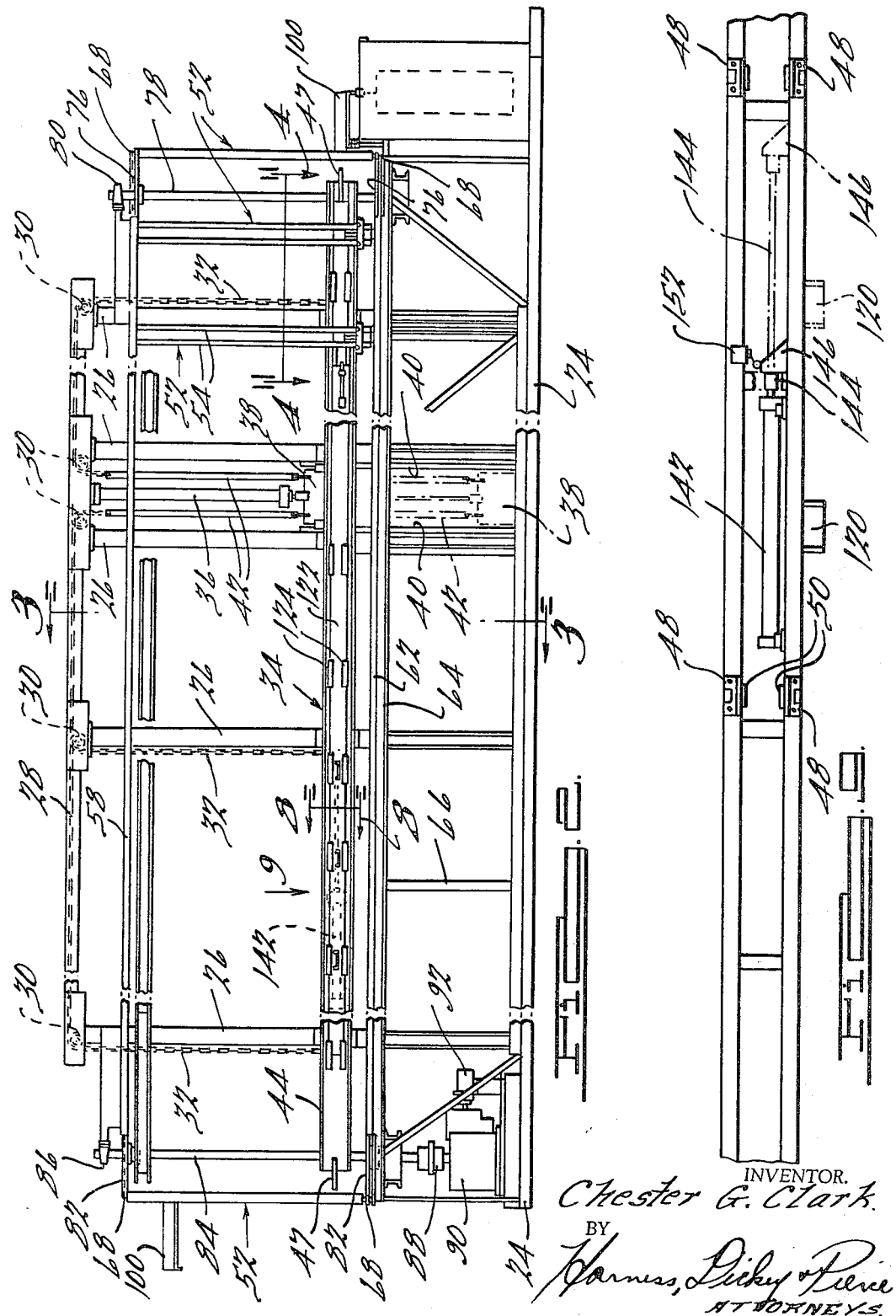

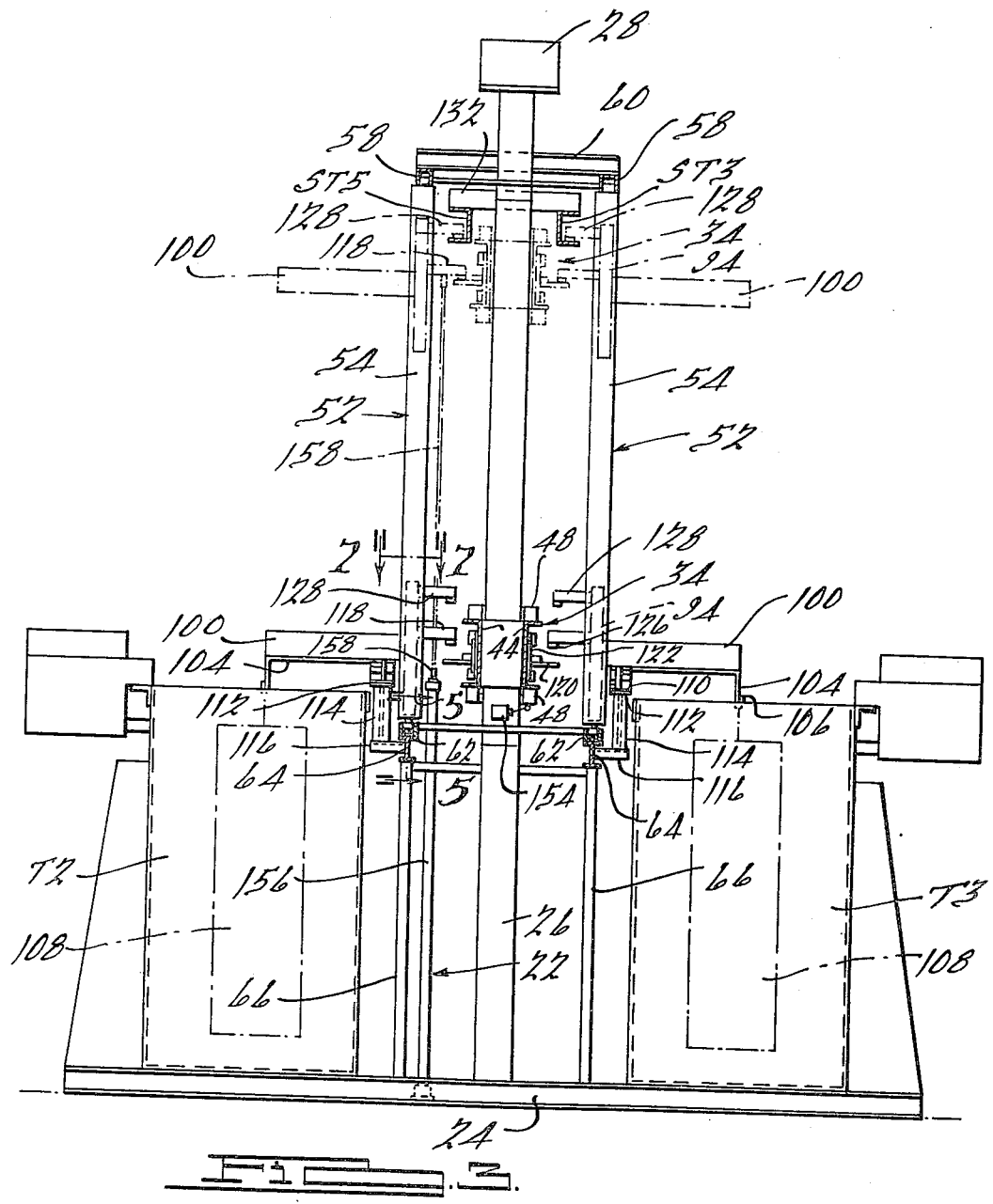

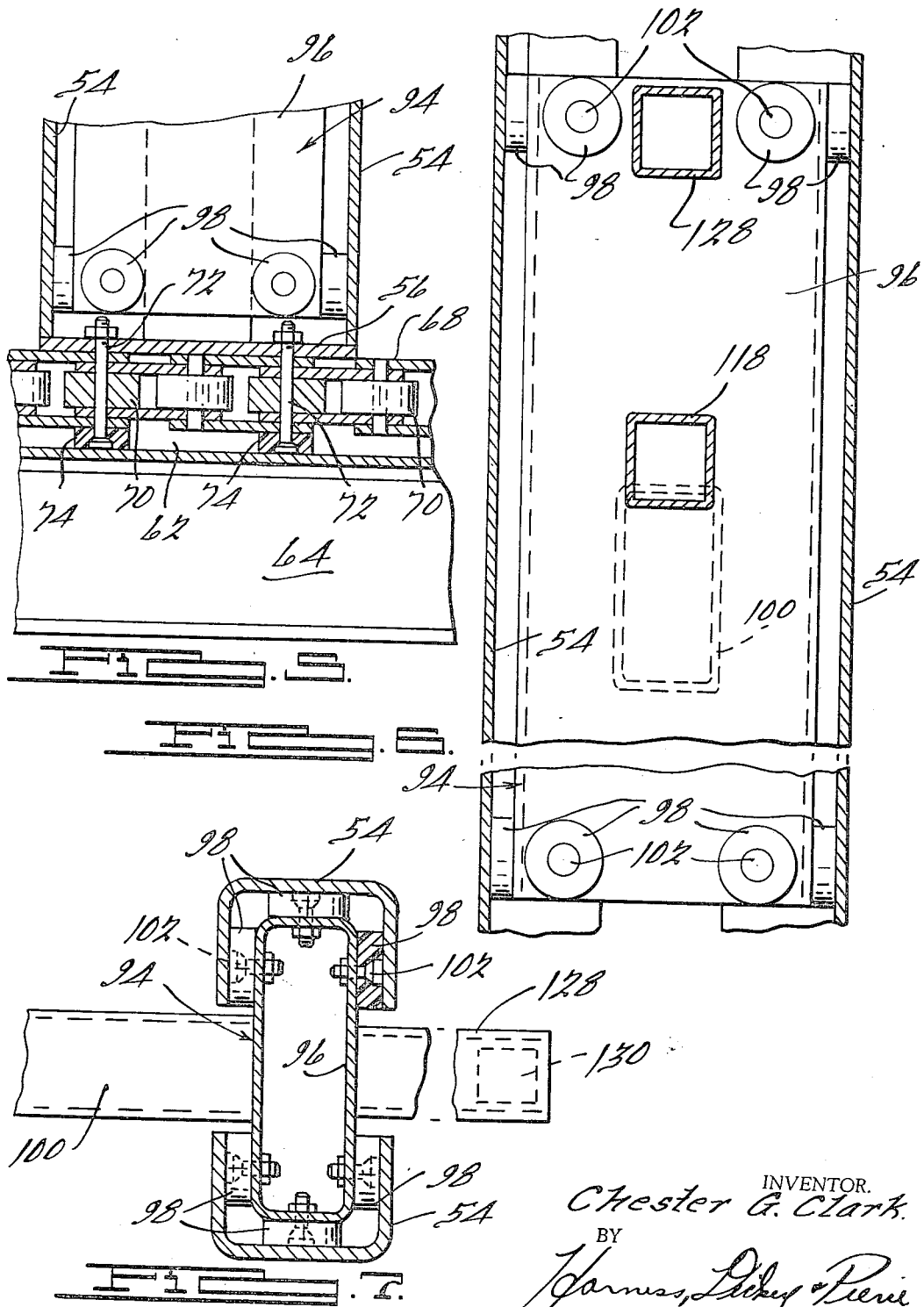

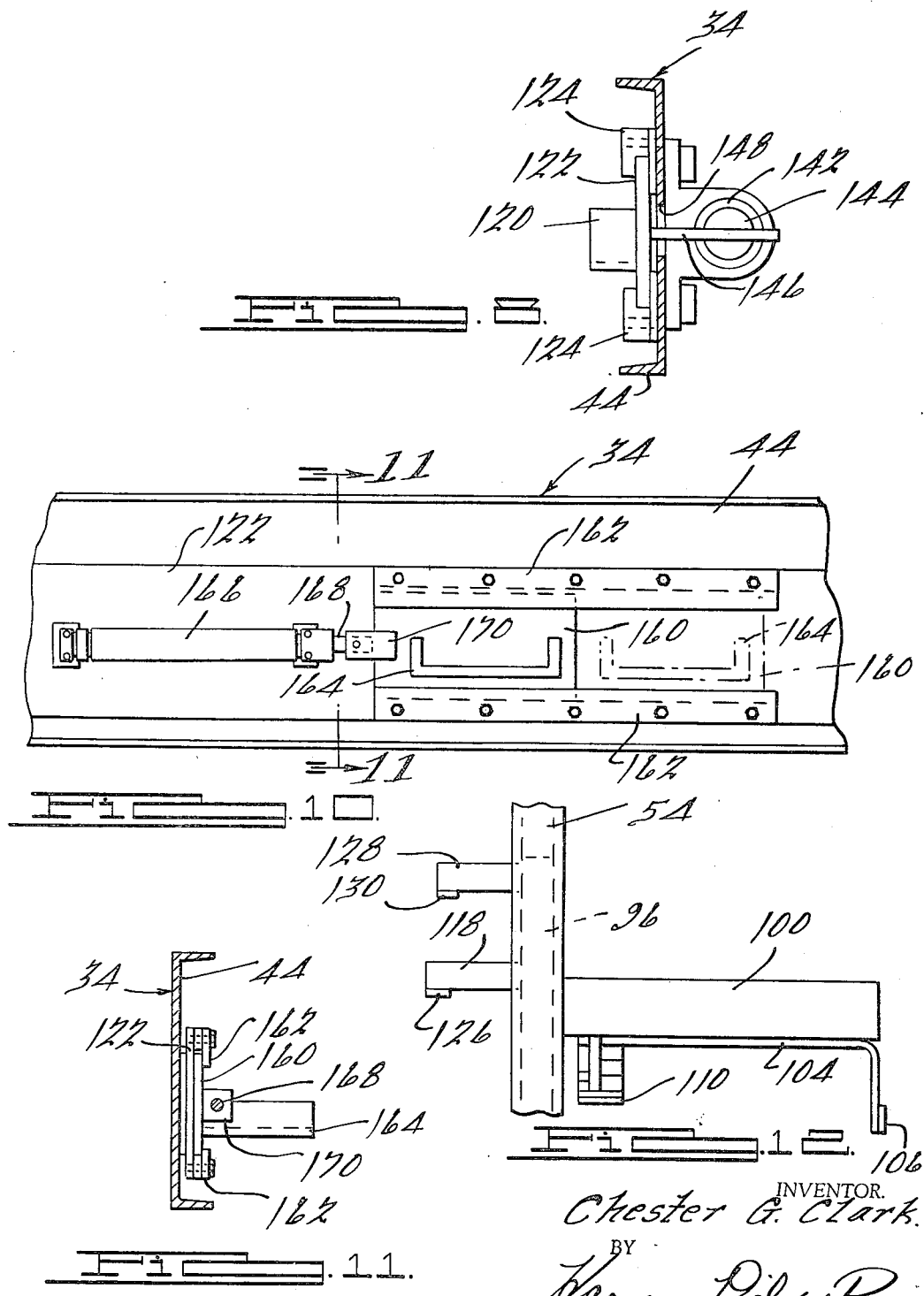

INVENTOR.
Chester G. Clark.
BY
Hornes, Dickey & Pierce
ATTORNEYS.

United States Patent Office 3,504,812
Patented Apr. 7, 1970

3,504,812
CONVEYING MACHINE
Chester G. Clark, Grosse Pointe Woods, Mich., assignor to The Udylite Corporation, a corporation of Michigan
Filed Apr. 1, 1968, Ser. No. 717,712
Int. Cl. B65g 35/00; B23q 7/00
U.S. Cl. 214—89                    10 Claims

ABSTRACT OF THE DISCLOSURE

A conveying machine for conveying workpieces through a series of treating stations including guide means on which a plurality of work carriers are movably mounted and are interconnected to each other at spaced intervals. Each work carrier comprises a carriage frame on which a carriage is mounted for movement between a lowered position and a raised position in response to the up and down movement of an elevator chassis. Each carriage incorporates engaging means thereon and the elevator chassis incorporates a reciprocable member having supporting means thereon which engage the engaging means on the carriages for lifting the carriages during the ascending movement of the chassis and also travel in unison with the carriages and through an increment corresponding to the advancing movement of the carriages from one station to the next station. The work carriers are advanced from one station to the next station either in response to the reciprocating motion of the engaged supporting means or by driving means connected to the interconnecting means. The workpieces are suspended from a supporting arm affixed to each carriage of each work carrier.

BACKGROUND OF THE INVENTION

Conveying apparatuses of the general type to which the present invention is directed are in widespread commercial use for conveying workpieces mounted on suitable work racks through a series of treatment stations, such as encountered, for example, in chemical, electrochemical, electroplating, or the like, processes. In so-called arm-type conveying machines in which category the apparatus of the present invention can be classified, the workpieces or work racks on which the workpieces are mounted are suspended from an arm extending laterally of the work carrier and the work supporting arm is sequentially raised and lowered as it is intermittently advanced, whereby the workpieces are sequentially immersed in a series of aligned treating receptacles. In machines of this type heretofore known, various transfer mechanisms and lift mechanisms have been employed which must be coordinated in operation so as to assure proper engagement of the work carriages to provide the appropriate lifting and transfer of the work supporting arms thereon.

As is frequently desirable in machines of the foregoing type, devices are included for providing a delayed set-down, early pick-up and/or skip operation of selected ones of the work carriers, whereby the workpieces thereon undergo a treatment which deviates from the normal processing cycle of the machine. The increased flexibility and versatility provided by such delayed dip, early pick-up and skip operations has, however, been accompanied by increased difficulty in cordinating the several operative components of the machine to assure a proper cycling of the work carriers and workpieces suspended thereon. There has also been a need for a simplification of the transfer and lift-engaging mechanisms of such conveying apparatus to provide a structure which is simpler and more economical to manufacture, as well as more durable in operation, requiring simpler controls to assure accurate coordination thereof.

The machine comprising the present invention overcomes the problems and difficulties associated with machines of similar type heretofore known by providing a combination transfer and lift-engaging mechanism which is substantially simpler than the mechanisms heretofore known, while at the same time assuring positive engagement of the work carriage supporting arms in all moved positions thereof, avoiding any inadvertent droppage of an arm during the course of its travel along the treating stations. In addition, a substantial simplification has been provided in the work carriers themselves which not only enhances the guided movement of the work supporting arm and workpieces suspended therefrom, but further, provides for electrical insulation of the work supporting arm from the machine frame.

SUMMARY OF THE INVENTION

The foregoing and other benefits and advantages of the present invention are achieved by a conveying machine in which a plurality of work carriers are movably mounted on guide means and are interconnected to each other at spaced intervals corresponding to the spacing between adjacent treating stations. Each work carrier comprises an upright carriage frame on which a work carriage is movably mounted for up and down movement in response to engagement with a lift mechanism reciprocably mounted on an elevator chassis disposed adjacent to the path of travel of the work carriers. Each work carriage is provided with a work supporting arm thereon from which workpieces are suspended. An engaging member is mounted on each work carriage which is adapted to be engaged by the lift mechanism on the elevator chassis and which mechanism is operable to reciprocate in unison with the work carrier during the transfer movement thereof through an increment corresponding to the transfer stroke of the carriers from one station to the next station. In accordance with one embodiment of the present invention, the transfer of the work carriers is achieved by driven means connected to the means interconnecting the carriages, while in accordance with a second embodiment of the present invention, the transfer movement of the work carriers is provided by the reciprocatory interengaging relationship with the lift mechanism on the elevator chassis.

The lift mechanism is further provided with a selectively reciprocable lift member, which is longitudinally reciprocable relative thereto for selectively engaging a work carrier, effecting a lifting of the work supporting arm at a point intermediate its travel through a multiple station treating receptacle, thereby providing an early pick-up operation. The conveying apparatus may also be provided with engaging means at one or more stations for retaining the work supporting arm in an elevated position for a preselected time period after the elevator chassis has been lowered, providing therewith a delayed set-down operation. Additionally, a vertically fixed track can be provided along selected sections of the machine to engage the work supporting arm on a carrier and retain the work supporting arm in an elevated position for a prescribed number of treating stations, effecting thereby a skip operation of those stations.

The foregoing and other advantages of the conveying machine comprising the present invention will become apparent upon a reading of the description of the preferred embodiments of the present invention taken in conjunction with the accompanying drawings.

BRIEF DESCRIPTION OF THE DRAWINGS

FIGURE 1 is a schematic plan view of a typical return-type conveying machine mounted centrally of an aligned series of treating receptacles;

FIGURE 2 is a fragmentary side elevational view of a conveying machine constructed in accordance with the preferred embodiments of the present invention;

FIGURE 3 is a transverse vertical sectional view through the conveying machine shown in FIGURE 2, and taken substantially along the line 3—3 thereof;

FIGURE 4 is a fragmentary horizontal sectional view of one end portion of the elevator chassis taken substantially along the line 4—4 of FIGURE 2;

FIGURE 5 is a fragmentary enlarged vertical sectional view through the chain and lower portion of the carriage frame as viewed substantially along the line 5—5 of FIGURE 3;

FIGURE 6 is an enlarged fragmentary rear elevation view, partly in section, of the carriage movably mounted within the carriage frame;

FIGURE 7 is an enlarged horizontal sectional view through the carriage frame, taken substantially along the line 7—7 of FIGURE 3;

FIGURE 8 is a fragmentary enlarged vertical sectional view through the lift mechanism mounted on one side of the chassis as shown in FIGURE 2, and taken substantially along the line 8—8 thereof;

FIGURE 9 is a magnified plan view of the slide plate actuating mechanism of the lift mechanism as viewed along the arrow indicated at 9 in FIGURE 2;

FIGURE 10 is an enlarged side elevational view of the early pickup mechanism on the elevator chassis;

FIGURE 11 is a vertical transverse sectional view through the early pickup mechanism shown in FIGURE 10, and taken substantially along the line 11—11 thereof;

FIGURE 12 is a fragmentary enlarged side elevational view of the work carrier and work supporting arm on the work carriage thereof;

DESCRIPTION OF THE PREFERRED EMBODIMENTS

Figure 13:
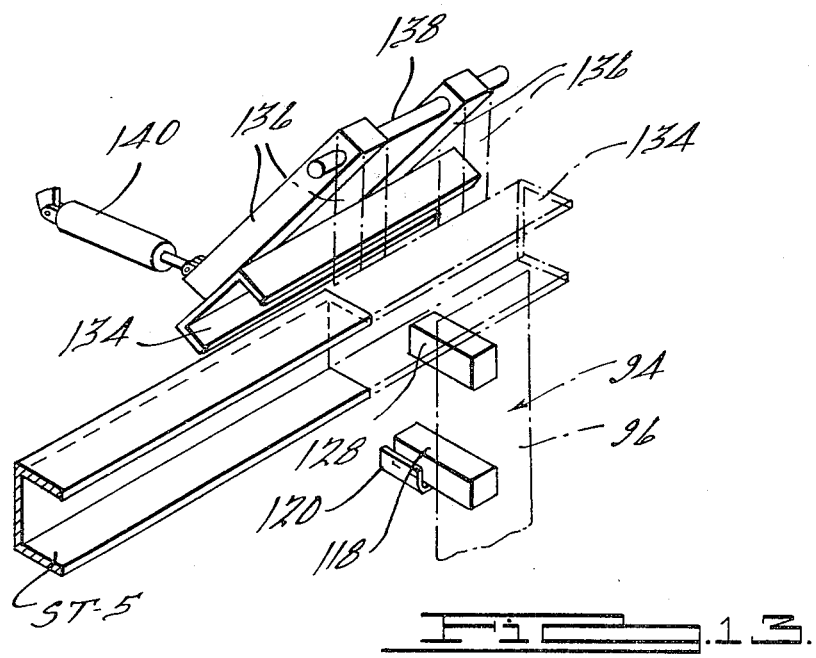
FIGURE 13 is a fragmentary perspective view of a selectively movable skip rail section.

Referring now in detail to the drawings and as may be best seen in FIGURE 1, a typical machine arrangement is illustrated in which the treating stations numbered S1 through S37 are arranged in two aligned rows and wherein the workpieces are transferred from a load station at the left-hand end of the machine, as viewed in FIGURE 1, through the treating stations and are removed at the unload station adjacent to the load station at the completion of the treatment cycle. This foregoing arrangement is of the so-called reutrn-type in which the work carriers travel in a closed circuit and in a clockwise direction as indicated by the arrows in FIGURE 1.

In the typical arrangement as illustrated in FIGURE 1, the workpieces are loaded at the load station and are transferred from station S1 to station S2, at which a sutiable cleaning operation, such as an anodic cleaning treatment, is performed thereon. The workpieces are thereafter transferred to station S3, wherein they are rinsed and are then conveyed to a multiple station treating receptacle encompassing stations S4–S6, at which an acid pickling operation is performed thereon. Upon emergence from station S6, the workpieces are subjected to a water rinse at station S7, whereafter they are again subjected to a second anodic cleaning operation at the multiple station receptacle encompassing stations S8–S11. The workpieces are again rinsed at station S12 and are subjected to an acid dip at station S13 and a rinsing at station S14. After the pre-treatment and cleaning cycle encompassed by stations S1–S14, the workpieces enter a multiple station U-shaped treating receptacle, indicated at T1, extending around the right-hand end portion of the machine as viewed in FIGURE 1 encompassing stations S15–S27, in which an electroplating operation is performed thereon such as a cadmium plating, for example.

At the completion of the electroplating operation, the workpieces are rinsed at station S28; are given a bright dip at station S29; and are subjected to a cold water rinse treatment at station S30. After rinsing, the workpieces are subjected to a dichromate treatment at station S31, followed by a cold water rinse treatment at station S32, and finally a warm water rinse at station S33. Thereafter the workpieces pass through a drying phase encompassed by stations S34–S36, and are conveyed to station S37 preparatory to an unloading thereof from the work supporting arms. It will be appreciated by those skilled in the art that the foregoing treating cycle is typical of any one of a number of cycles to which the apparatus comprising the present invention is adaptable.

In order to provide for increased flexibility and versatility in the treatment of workpieces on successive work carriers which are to be subjected to selected variations in treatment from that provided by the normal processing cycle, one or more of the treating stations can be provided with selectively operable devices for providing a skip, delay-dip and early pickup of the work supporting arms of the work carriers, whereby the workpieces either entirely skip treatment in one or more of such stations or are subjected to a shorter duration of treatment consistent with the intended end use to which the workpieces are to be subjected. In this regard, and referring again to FIGURE 1, a skip track, indicated at ST1, is provided at station S2, such that selected ones of the work carriers can omit the anodic cleaning treatment provided at that station. Similarly, skip track ST2 enables a skipping of the acid pickle stations S4–S6 inclusive. Skip track ST3 enables omission of treatment at the anodic cleaning stations S8–S11, while skip track ST4 enables selected ones of the work carriers to skip treatment at the acid dip station S13.

Typical of the application of an early pickup device is that diagrammatically illustrated at station S21 and indicated at 20 by virtue of which selected ones of the work racks can be withdrawn from the multiple station treating receptacle T1 after undergoing an electroplating of the workpieces through stations S15–S21. A suitable skip track ST5 extends from the early pickup device 20 to station S28, whereby the work supporting arm undergoing an early pickup operation at station S21 is retained in the elevated position for the balance of stations S22–S27 of the multiple station tank T1.

A typical use of a delayed set-down device is indicated by the numeral 22 at stations S29 and S31 in FIGURE 1. Selected actuation of the delayed set-down device 22 enables workpieces to be immersed at these two stations for a shorter duration of time than that provided by the normal processing cycle of the machine, thereby providing a selected variation in their total treatment. It will be appreciated by those skilled in the art that the particular disposition of the skip tracks, early pickup devices and delayed set-down devices can be varied in accordance with the specific type of treatment being performed and to provide selected variations in that treatment at one or more treating stations therealong.

Having thus described a typical processing cycle and variations thereof as typical of those possible by the conveying machine comprising the present invention, a description of the structural features of the machine will now be made with particular reference to FIGURES 2–5, inclusive.

As best seen in FIGURES 2 and 3, the conveying machine comprises a central framework consisting of a platform 24 comprised of a series of interconnected beams on which a series of upright columns 26 are rigidly secured at longitudinally spaced aligned intervals therealong. The upper ends of the columns 26 are connected to a longitudinally extending channel 28, which also serves to guidably support a plurality of sprockets 30, over which suitable lift chains 32 are trained. The lift chains 32 extend downwardly along each of the columns 26 and are connected at one of their ends to an elevator chassis 34, which is guidably mounted for up and down movement on the columns 26. The elevator chassis 34 is shown in FIGURES 2 and 3 in the lower position in solid lines and in phantom in FIGURE 3 in the raised position.

Movement of the elevator chassis 34 between an elevated position and a lowered position is achieved by a lift cylinder 36, as shown in FIGURE 2, having its blank end affixed to the underside of the channel 28 at a point substantially equidistant between the central columns 26 of the machine framework. The piston rod end of the lift cylinder 36 is connected to a crosshead 38, which is guidably disposed on vertically extending rails 40 affixed to the opposed surfaces of the columns and is reciprocable from the position as shown in solid lines in FIGURE 2 to a lowered position shown in phantom. A pair of draw bars 42 are affixed to the upper edge of the crosshead 38, to the upper ends of which the ends of the several lift chains are secured and, accordingly, are reciprocated in response to the reciprocating travel of the crosshead.

The elevator chassis 34 consists of a pair of oppositely-disposed longitudinally extending channel-shaped members 44, which are affixed in substantially parallel spaced relationship by a series of transverse brackets or braces 46, as best seen in FIGURE 4. The lift chains are conveniently connected to selected ones of the braces 46 for suspending the elevator chassis therefrom. An arcuate guide member 47, as shown in FIGURE 4, is affixed to each end of the elevator chassis for the purpose subsequently to be described. Guidance of the elevator chassis along the columns 26 during its movement between the raised and lowered position, as well as when stationarily disposed at each position, is provided by means of angle iron brackets 48, as best seen in FIGURE 4, which are adjustably mounted on the upper and lower horizontal flange surfaces of the channel-shaped members 44 and are provided with a facing 50 of an antifriction material disposed in sliding bearing contact with the opposed face surface of the column 26.

A plurality of work carriers 52, as best seen in FIGURES 2, 3, 5 6 and 7, are movably mounted on the machine framework for movement along the aligned straight side sections of the machine and the arcuate end turnaround portions thereof. Each of the work carriers 52 comprises a carriage frame consisting of a pair of opposed channel-shaped upright guide members 54, which are interconnected at their lower ends such as by end brackets 56, as shown in FIGURE 5, maintaining them in appropriate spaced substantially parallel relationship. The upper ends of each of the carriage frames are guidably supported in an inverted U-shaped guide track 58, as best seen in FIGURE 3, which is affixed to the underside of a series of transverse braces 60 attached to the columns 26. The lower end portions of the guide frames of each work carriage similarly are guidably supported in a U-shaped guide track 62 mounted on longitudinally extending I-beams 64, which are supported by a series of upright braces 66.

Each of the carriage frames comprising the upright channel-shaped guide members 54 interconnected at their upper and lower ends by the end brackets 56 are connected at longitudinally spaced intervals to a continuous roller chain 68, as best seen in FIGURE 5. The roller chain 68 is disposed within the spaced flanges of the guide tracks 58 and 62, with the rollers 70 thereof positioned in rolling guided bearing contact against the inner surfaces thereof. The carriage frame is connected to two spaced links of the roller chain, as shown in FIGURE 5, by means of through-bolts 72, which extend through and are appropriately fastened to the end bracket 56. A slide element 74 is affixed around the lower head portion of the through-bolts 72, which is recessed upwardly from its lower sliding face, and which in turn is disposed in sliding bearing contact against the horizontal flange of the lower guide track 62.

The slide elements 74 may be composed of any suitable low friction material, such as synthetic plastic materials including Delrin, polytetrafluoroethylene, fluorinated ethylene propylene, polypropylene, or the like, which may additionally incorporate particulated solid lubricating fillers therein, such as, for example, graphite particles, molybdenum disulfide particles, etc. In accordance with this arrangement, the weight of each work carrier is supported on the slide element, which in turn is disposed in sliding bearing contact against the upper surface of the horizontal flange of the lower guide track 62, which minimizes the static and dynamic friction and assures smooth transfer of the work carriers from one station to the next station. Slide elements 74 are ordinarily not required at the upper roller chain 68, which is simply retained in appropriate aligned relationship with the upper guide track by virtue of the rolling guided contact of the rollers thereof against the inner surfaces of the depending flanges.

As will be seen in FIGURES 2 and 3, the upper and lower guide tracks 58, 62 extend along each of the straight side sections of the machine. Guidance of the upper and lower roller chain around the arcuate end portion of the machine is achieved, as shown in FIGURE 2, by a pair of rotatably mounted idler sprockets 76 supported on a vertically extending shaft 78 mounted in bearings 80 disposed at substantially the center of the arcuate curvature of the machine end. In a similar manner, the upper and lower roller chains at the left-hand end of the machine, as viewed in FIGURE 2, are trained around drive sprockets 82 affixed to a vertically extending drive shaft 84, which is rotatably supported at its upper end in a bearing 86 and is coupled, as at 88, at its lower end to the output shaft of a suitable gear reducer 90 mounted on the machine platform 24. The power input into the gear reducer 90 is provided by a motor 92 for effecting intermittent rotation of the drive shaft 84 and drive sprockets 82 thereon, which in turn effects a corresponding intermittent translatory movement of the upper and lower roller chains 68 and a corresponding advancing movement of the work carriers 52.

Each work carrier incorporates a work carriage 94, as best seen in FIGURES 6 and 7, which is slidably disposed and guidably mounted for vertical movement between the upright channel-shaped guide members 54. The work carriage comprises a body 96, which is of a generally rectangular tubular cross section to the upper and lower end portions of which slide members 98 are removably mounted. The slide members 98 are affixed to the forward and rearward faces, as well as the side edges, at each corner of the body 96 and are disposed with the faces thereof in sliding bearing contact against the adjacent guide surface of the guide member 54. The slide members 98 may be of any suitable low friction material which possesses good cold flow characteristics such as the materials previously enumerated of which the slide elements 74 can be composed. The utilization of the slide members 98 on the work carriage avoids the problems heretofore associated with rollers which have a tendency to malfunction due to the leaching of lubricants therefrom as the result of the corrosive and solvent containing atmospheres to which they are subjected during the operation of the machine. Due to the self-lubricating characteristics of the slide members 98, substantially improved performance is achieved with only minimal maintenance and service, which constitutes still a further improvement of the present invention. Another important feature provided by the slide members 98 is the electrical insulation of the work carriage 94 from the carriage frame and the remainder of the machine, whereby electrification of a work supporting arm 100, rigidly affixed to and projecting outwardly of one face of the body 96, is not conducted to other components of the machine.

As will be best seen in FIGURES 6 and 7, the slide member 98 is of a circular cylindrical configuration and is provided with a bore extending axially therethrough which is provided with a counterbore in which the head of a fastening bolt 102 is disposed in recessed relationship with respect to the bearing surface of the slide member. This construction enables simple and quick removal of any one of the slide members 98 and replacement with a new slide member to compensate for any wear resulting from operation of the machine.

The work supporting arm 100, as is best seen in FIGURES 3, 6, 7 and 12, is of a rectangular tubular cross section and is rigidly affixed such as by welding, for example, to the forward face of the body 96 of the work carriage. The work supporting arm projects laterally of the carriage frame and extends outwardly to a position approximately at the midpoint of a treating receptacle, such as the tanks T2 and T3 illustrated in FIGURE 3. An L-shaped bar 104 of a conductive material, such as copper or alloys of copper, is rigidly secured to the underside of the work supporting arm and is formed at its outer depending end with a transverse bracket 106, on which the work racks, such as the racks 108 shown in phantom in FIGURE 3, are suspended. The inner end of the L-shaped bar 104 is electrically connected to a resiliently biased contact shoe 110, which is adapted to overlie and slidably engage a flat bus bar 112, as shown in FIGURE 3, extending along the treating stations at which an electrification of the workpieces on the work racks is desired.

The bus bar 112 is supported on the upper end of upright braces 114 which are secured to laterally extending outriggers 116 affixed to the longitudinally extending I-beam 64. The weight of the work carriage 94 and the work rack suspended from the work supporting arm thereof is supported by the body 96 of the work carriage which bottoms out against the end brackets 56 of each carriage frame as shown in FIGURE 5. In that position, the springs supporting the resiliently-biased contact shoe 110 are partly compressed, assuring good electrical contact with the bus bar. Alternatively, the weight of the work carriage can be supported by the bus bar itself at electroplating stations and a similar non-electrified support at non-electroplating stations.

In lieu of the construction as illustrated in FIGURES 3 and 12, in which the L-shaped bar 104 is in electrical contact with the work supporting arm 100, it is also contemplated that suitable electrically insulated spacers can be employed for mounting the L-shaped bar 104 in electrical insulated relationship with respect to the work supporting arm.

Up and down movement of the work carriage and the work rack suspended from the work supporting arm thereof is achieved in response to the ascending and descending movement of the elevator chassis, as shown in FIGURE 3, from a lowered position as shown in solid lines to a raised position as shown in phantom. Lifting engagement of the work carriage by the elevator chassis is achieved by an engaging member 118 rigidly affixed to the rear face surface of the body 96 of the carriage, as best seen in FIGURES 3, 6, and 7, and which projects rearwardly thereof to a position adjacent to the vertical path of travel of the chassis. The chassis in turn is provided with a plurality of laterally extending lift pads 120, which are affixed to a slide plate 122, as best seen in FIGURE 8, which is slidably supported at longitudinally spaced intervals between edge overlying slide shoes 124. As will be noted in FIGURE 3, when the elevator chassis is in the fully lowered position, as shown in solid lines, the engaging upper surface of the lift pads 120 are disposed below and in horizontal clearance relationship with respect to an engaging pad 126 affixed to the outer underside of the engaging member 118. In response to the ascending movement of the elevator chassis, the lift pad 120 is raised into supporting engaging contact with the engaging pad 126 and the engaging member 118, effecting upward movement of the work carriage from the lowered position to the raised position in which the lower ends of the work racks 108 are disposed in clearance relationship with respect to the upper edges of the partitions separating adjoining treating receptacles.

A second engaging arm 128 is also affixed to the rear face of the body of the work carriage, as best seen in FIGURE 12, at a position above the engaging member 118 and similarly projects rearwardly thereof and is provided with a supporting pad 130 at the outer lower portion thereof. As will be noted in FIGURE 3, when the elevator chassis and the work carriage are in a fully raised position, the lower surface of the supporting pad 130 on the engaging arm 128 is in horizontal alignment with the upper surface of a U-shaped skip track, such as the skip tracks ST5 and ST3, extending along selected portions of the machine as previously described in connection with FIGURE 1.

The skip tracks, such as the skip tracks ST3 and ST5, as shown in FIGURE 3, are securely fastened to the underside of a cross member 132 attached to the columns 26 of the central machine framework. When an engaging arm 128 of a work carrier is supported by a skip track, the work carriage remains in the elevated position after the elevator chassis descends, whereby the work racks suspended from the work supporting arm are not immersed in a treating solution disposed at that station, providing therewith a skip operation. The positioning of the engaging arm into overlying supporting relationship with the lower flange of a skip track is accomplished during the advancing movement of a work carrier from one station to the next station.

Selectivity as to which of the several work carriers are to undergo a skip operation at selected ones of the treating stations is achieved by the selective movement of a skip rail section 134, as shown in FIGURE 13, from an inoperative position as shown in solid lines to an operative position as shown in phantom, in which it is disposed in alignment with the fixedly positioned skip rail. In the arrangement as illustrated in FIGURE 13, the skip rail section 134 is pivotally supported by braces 136 on a cross bar 138, which is secured to the central machine framework (not shown). Pivoting movement of the skip rail section between the retracted inoperative position and the projected operative position is achieved such as, for example, by a suitable double-acting fluid-actuated cylinder 140, which can be actuated by the machine operator from a remotely controlled position or can be actuated by the central control circuit in accordance with a preselected programmed operating cycle. Alternatively, the work carrier that is to undergo a skip cycle can be provided with a suitable actuator adapted to trip a sensing device prior to the arrival of the work carrier at that station, which in turn signals the central control circuit to move the skip rail section into position for providing a skip operation of the workpieces on that work carrier.

With the skip rail section 134 in the normal inoperative position, as shown in solid lines in FIGURE 13, a work carriage 94 at the completion of its advancing movement is disposed in the position as illustrated by the engaging member 118 and the engaging arm 128 projecting rearwardly of the body 96 thereof. In that condition, the engaging arm 118 and the work carriage 94 is supported by the lift pad 120 affixed to the slide plate of the elevator chassis (not shown). Accordingly, when the elevator chassis is lowered, the work carriage 94 and the work rack supported therefrom are similarly lowered, whereby they undergo the appropriate sequence at the treating station therebelow. On the other hand, when the workpieces are to undergo a skip operation of that treating station, the skip rail section is moved from the inoperative position as shown in solid lines in FIGURE 13 to the operative position as shown in phantom whereupon, during the advancing movement of the work carriage 94, its engaging arm 128 is advanced into supporting relationship with the upper flange surface of the skip rail section. The work carriage is accordingly retained in the elevated position after the elevator chassis and the lift pad 120 thereof descends to the lowered position. Upon the subsequent advancing movement of the work carriers, the carriage 94 and the engaging arm 128 thereof is advanced into further supporting relationship with the fixed skip track ST5, wherein the carriage is retained in the elevated position for a plurality of treating stations. After the appropriate number of one or more treating stations are skipped, as established by the length of the skip track, the carriage 94 is eventually transferred beyond the end of the skip track, releasing the engaging arm 128 and with an appropriate lift pad 120 disposed in supporting relationship beneath the engaging member 118 of the carriage. Accordingly, the carriage then descends in response to the next descending movement of the elevator chassis.

The coordinated reciprocating movement of the lift pads 120 on the slide plate 122 in unison with the advancing movement of the work carriers in accordance with one embodiment of the present invention will now be described with particular reference to FIGURES 4, 8 and 9. In accordance with this embodiment, the advancement of the work carriers is achieved in response to the advancing movement of the roller chains 68 as provided by the drive motor 92 and gear box 90, as shown in FIGURE 2, which are coupled to the vertical drive shaft 84 and the drive sprockets 82 disposed at the left-hand end of the machine. Each slide plate 122 which is slidably mounted for reciprocatory movement along each side of the elevator chassis when in the elevated position undergoes a corresponding reciprocatory movement such that the lift pads thereon are at all times disposed in supporting relationship with the engaging members 118 on the work carriages.

As shown in FIGURES 8 and 9, this reciprocating travel is achieved by a slide cylinder 142 mounted along the inner surface of one of the longitudinally channel-shaped members 44 of the chassis and with the end of its piston rod 144 securely fastened to a bracket 146, which extends through a longitudinally positioned slot 148 in the member 44 and is fastened to the inner surface of the slide plate 122. The slide cylinder 142 may be of a double-acting type, whereby movement of the slide plate from a retracted position as shown in phantom in FIGURE 9, to an advanced position as shown in solid lines, is achieved under power of the slide cylinder or, alternatively, the coaction of the engaging members 118 of the work carriages with the U-shaped lift members 120 can be employed for effecting a telescoping of the piston rod 144 within the slide cylinder 142 in response to the driving action of the roller chains 68. This telescoping action effects a dumping or emptying of the fluid within the slide cylinder preparatory to its reactuation for returning the slide plate and the lift pads thereon to the retracted position after the elevator chassis has been lowered.

In order to assure uniform travel of the slide plates 122 along each side of the elevator chassis, as shown in FIGURE 4, the ends of the slide plates can be suitably interconnected by means of a flexible element or roller chain 150, which is trained around and guidably supported by the arcuate guide members 47 affixed to each end of the elevator chassis. Accordingly, the driving reciprocatory movement imparted to one slide plate by the slide cylinder 142 is correspondingly imparted to the slide plate on the opposite side of the elevator chassis through the roller chains 150.

Upon the completion of the transfer movement of the work carriages such as, for example, by the tripping of a transfer limit switch 152, as shown in FIGURE 9, by the bracket 146, the central control circuit is signaled of the happening of this event, and the lift cylinder 36 is actuated, whereby the elevator chassis is lowered. Upon attaining the lowered position as may be conveniently signaled by a down position limit switch 154, as shown in FIGURE 3, and in which position the lift pads are disposed below and in horizontal clearance relationship with respect to the lift members 118 projecting rearwardly of the work carriages, the central control circuit effects an energization of the slide cylinder 142, whereupon it moves the slide plates from the position as shown in solid lines in FIGURE 9 to the retracted position as shown in phantom. In the fully retracted position, the lift pads are disposed in vertical alignment beneath an engaging member of a work carriage which is to be raised in response to the next ascending movement of the elevator chassis.

In accordance with a second embodiment of the present invention, the transfer movement of the work carriages is achieved entirely by the reciprocating travel of the slide plates and the roller chains 68 which interconnect the carriage frames at their upper and lower ends merely serve to effect a transfer of those carriages which are not similarly engaged by a lift pad. In accordance with this second embodiment, the machine is the same as that illustrated in FIGURE 2, but the gear reducer 90 and drive motor 92 is eliminated and the shaft 84 merely serves to support the sprockets 82 which become idler sprockets in accordance with the structure of the shaft 78 and idler sprockets 76 at the opposite end of the machine. The operation of the machine is substantially the same, but wherein the slide cylinder 142, as shown in FIGURE 9, is actuated in both directions so as to achieve a transfer of the work carriages in response to its transfer movement from the position as shown in phantom to the advanced position as shown in solid lines, whereafter the chassis is lowered and upon attaining the lowered position, is again actuated to effect reciprocatory travel of the slide plate and the lift pads thereon to a retracted position preparatory to the next lifting movement of the chassis. This operating sequence is best illustrated in accordance with the schematic diagram in FIGURE 14.

Figure 14:
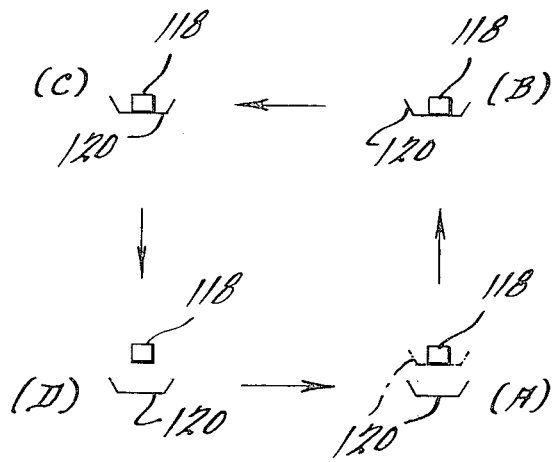
FIGURE 14 is a schematic diagram of a typical lifting and transfer cycle through which the lift pad and an engaging member on a work carrier undergoes.

As shown in FIGURE 14, a typical lifting and transfer cycle is portrayed which will be described starting with the position indicated at (A) in which the lift pad 120 is in the fully lowered position and is disposed in horizontal clearance relationship beneath an engaging member 118 of a work carrier. At the completion of a suitable down dwell time period, as signaled by a suitable timer incorporated in the central control circuit of the machine, the lift cylinder of the elevator chassis is energized effecting an upward movement of the chassis including the lift pad 120 thereon, whereupon it is raised to the position wherein it becomes engaged with the engaging member 118 and effects a lifting of the work carriage to a fully elevated position, as typified by the position indicated at (B). After the fully elevated position of the elevator chassis has been attained, the slide plate cylinder affixed to the slide plates is energized, effecting a horizontal transfer of the lift pad 120 toward the left and by which movement the engaging member 118 and the work carrier is transferred through a preselected advancing stroke to a position indicated at (C), at which the work racks thereon are suspended above the next treating station. At the completion of the transfer movement of the slide plate, the lift cylinder of the elevator chassis is again energized, whereupon it is moved from the raised position to the lowered position, as typified by the position indicated at (D) of FIGURE 14, and wherein the lift pad 120 is again disposed beneath and in horizontal clearance relationship relative to the engaging member 118. Upon the attainment of the fully lowered position, the slide plate cylinder is again actuated, effecting a retraction of the lift pad from the position indicated at (D) to the position indicated at (A), wherein it is again disposed beneath an engaging member 118 of the next work carriage which is to be elevated and transferred in accordance with the sequence previously described.

As previously mentioned, the conveying machine comprising the present invention is also adaptable for a delayed setdown operation such as by providing a delayed setdown device, indicated at 22 in FIGURE 1, at stations S29 and S31. The delayed setdown device 22, as best seen in FIGURE 3, comprises an elongated cylinder 156 having its blank end rigidly connected to the machine platform 24 and extends upwardly in a substantially vertical direction at the center line of a work carriage positioned at that station. A piston rod 158 of the cylinder 156 is adapted when in a fully extended position to be disposed in supporting contact beneath the engaging arm 118 of the work carriage, as illustrated in phantom in FIGURE 3, at a point intermediate the ends of the engaging member and outwardly of the lateral edge of a lift pad on the chassis. Accordingly, when the elevator chassis is lowered, the work carriage remains in the elevated position supported by the piston 158. A preselected time period after the elevator chassis has been lowered as may be established by a suitable delayed timer mechanism, the cylinder 156 of the delayed setdown device is actuated to enable a telescoping of the piston within the cylinder, either under power or under the action of gravity, whereupon the work racks suspended from the work supporting arm on the carriage are immersed in the treating solution a preselected period after the remaining work racks have been immersed, providing therewith a shortened treating duration.

It is also contemplated within the scope of the present invention that an early pickup operation, such as an early pickup at station S21 of the machine layout illustrated in FIGURE 1, can be provided to shorten the duration of treatment of selected ones of the workpieces in the multiple station treating receptacle T1. In accordance with a preferred embodiment of the present invention, this is achieved by an auxiliary slide plate 160, as shown in FIGURES 10 and 11, which is disposed in overlying relationship on the principal slide plate 122 and is positioned with the longitudinally extending edges thereof in sliding guided relationship with auxiliary guide shoes 162. A U-shaped lift pad 164 is attached to the auxiliary slide plate 160 in a manner similar to the principal lift pad 120 for engaging an engaging member 118 on a work carriage, which is to undergo an early pickup operation. The auxiliary slide plate 160 is selectively movable to and from an inoperative position, as shown in solid lines in FIGURE 10, to an operative position, as shown in phantom, by means of an early pickup cylinder 166, which is affixed to the outer surfaces of the slide plate 122. A piston 168 of the cylinder 166 is connected by means of a fitting 170 to the edge of the auxiliary slide plate 160, effecting a reciprocation thereof upon actuation between the two positions.

When in the inoperative position as shown in solid lines in FIGURE 10, the auxiliary lift pad 164 is disposed out of vertical alignment with an engaging member on a carriage and, accordingly, the carriage is undisturbed during the ascending and descending movement of the elevator chassis. However, upon actuation of the cylinder 166 and movement of the auxiliary slide plate and lift pad thereon to the operative position as shown in phantom in FIGURE 10, the auxiliary lift pad is disposed in vertical lifting alignment with an engaging member on a work carriage such as one disposed at station S21 of FIGURE 1. Accordingly, in response to the vertical ascending movement of the elevator chassis, the work carriage is elevated at station S21 and upon the transfer movement thereof while in an elevated position, is advanced into engaging relationship with the fixedly disposed skip track ST5, wherein it is retained in the elevated position for the balance of stations S22–S27 of the multiple station treating receptacle T1.

The cylinder 166 is normally actuated so as to effect a shifting movement of the auxiliary lift pad from the inoperative to the operative position, after the elevator chassis has attained the fully lowered position. The auxiliary lift pad is retained in the operative position once actuated until the completion of the transfer movement and during which movement the engaging arm 128 on the carriage is disposed in supporting relationship with the skip track. After such engagement and during the subsequent descending movement of the elevator chassis, the auxiliary slide plate and lift pad are moved to a retracted position in order that they are disposed out of vertical alignment with an engaging member of a work carriage disposed at the station therebelow. Selective actuation of the cylinder 166 and the auxiliary slide plate connected thereto can be achieved in a manner similar to that of the skip track section as previously described in connection with FIGURE 13.

What is claimed:

1. A conveying machine for conveying workpieces through a series of treating stations comprising a framework, guide means on said framework extending along the treating stations, a plurality of work carriers each including an upright carriage frame movably mounted on said guide means, and a carriage having a work supporting arm thereon guidably mounted on said carriage frame for movement between a raised position and a lowered position, connecting means extending between and interconnected to each said carriage frame for maintaining said frames in longitudinally spaced relationship during the intermittent transfer thereof between stations, an elevator chassis movably mounted on said framework, means for moving said chassis between a raised position and a lowered position, engaging means on each said carriage, supporting means on said chassis for coacting with said engaging means and for moving said carriages to and from said raised and said lowered position in response to the vertical movement of said chassis, said supporting means longitudinally reciprocable of said chassis when said chasses is in said raised position from a retracted to an advanced position in unison with and through an increment corresponding to the longitudinal transfer movement of said carriers, said supporting means movable from said advanced to said retracted position when said chassis is in said lowered position and said supporting means are disposed in clearance relationship relative to said engaging means.

2. The conveying machine as defined in claim 1, wherein intermittent advancement of said work carriers is achieved by drive means drivingly connected to said connecting means for effecting intermittent advancement thereof.

3. The conveying machine as defined in claim 1, wherein intermittent advancement of said work carriers is achieved by the coaction between at least one of said engaging means and said supporting means in response to the reciprocating movement of said supporting means from said retracted to said advanced position.

4. The conveying machine as defined in claim 1, wherein said supporting means comprises a longitudinally extending member having a plurality of laterally projecting lift pads disposed therealong at such stations at which a work carriage is to be moved between said raised and said lowered positions.

5. The conveying machine as defined in claim 1 wherein at least one said carriage further includes second engaging means thereon selectively movable into engaging relationship with a rail on said framework in response to the transfer movement of said work carrier when said chassis is in said raised position for retaining that carriage in said raised position after said chassis has been lowered.

6. The conveying machine as defined in claim 1, further including retaining means at at least one station for engaging a carriage at that station when in said raised position, said retaining means operative to lower said carriage independently of said chassis a predetermined time period after said chassis has been lowered.

7. The conveying machine as defined in claim 4, wherein one of said lift pads is mounted for selective reciprocating movement on said member to and from an engaging position disposed in vertical lifting alignment with said engaging means on a carriage and an inoperative position disposed in clearance relationship from said engaging means, said one of said pads selectively movable to said engaging position for lifting a carriage from said lowered position to said raised position, and means for retaining the raised said carriage in said raised position durng at least the next descending movement of said chassis.

8. The conveying machine as defined in claim 1, wherein said guide means comprises a pair of vertically spaced rails and said connecting means comprises continuous chains guidably supported by said rails.

9. The conveying machine as defined in claim 1, wherein said carriage frame includes a pair of spaced upright guide members each formed with at least one vertically extending guide surface, said carriage extending between said guide members and provided with shoes of an electrically insulating low frictional material disposed in sliding bearing contact against the guide surfaces thereof.

10. The conveying machine as defined in claim 9, wherein each said carriage includes contact means thereon for electrically contacting a bus bar at least at one of said stations for electrifying workpieces on said work supporting arm.

References Cited
UNITED STATES PATENTS

| | | | |
|---|---|---|---|
| 3,301,418 | 1/1967 | Davis | 214—89 |
| 3,331,518 | 7/1967 | Pianowski | 214—89 |

ALBERT J. MAKAY, Primary Examiner

U.S. Cl. X.R.

198—19

PO-1050
(5/69)

UNITED STATES PATENT OFFICE
CERTIFICATE OF CORRECTION

Patent No. 3,504,812     Dated    April 7, 1970

Inventor(s)    Chester G. Clark

It is certified that error appears in the above-identified patent and that said Letters Patent are hereby corrected as shown below:

Column 1, line 64, delete "cordinating" and insert ---coordinating---; Column 3, line 52, delete "reutrn" and insert --- return ---; Column 3, line 56, delete "and are" and insert --- and thereafter are ---; Column 12, Claim 1, line 32, delete "chasses" and insert --- chassis ---; Column 13, Claim 7, line 2, delete "of said pads" and insert --- of said lift pads ---; Column 13, Claim 7, line 6, delete "durng" and insert --- during ---.

SIGNED AND
SEALED
OCT 20 1970

(SEAL)
Attest:

Edward M. Fletcher, Jr.
Attesting Officer

WILLIAM E. SCHUYLER, JR.
Commissioner of Patents